(12) United States Patent
Glaser et al.

(10) Patent No.: US 11,067,197 B2
(45) Date of Patent: Jul. 20, 2021

(54) SUBSEA SHUT-OFF DEVICE

(71) Applicant: WITTENSTEIN SE, Igersheim (DE)

(72) Inventors: Markus Glaser, Hüttlingen (DE);
Robert Schreck,
Tauberbischofheim-Distelhausen (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 16/369,562

(22) Filed: Mar. 29, 2019

(65) Prior Publication Data
US 2019/0301635 A1   Oct. 3, 2019

(30) Foreign Application Priority Data
Mar. 29, 2018   (DE) .......................... 102018107644.4

(51) Int. Cl.
*F16K 31/52*   (2006.01)
*F16K 3/02*   (2006.01)
(Continued)

(52) U.S. Cl.
CPC ............ *F16K 31/523* (2013.01); *E21B 33/06* (2013.01); *E21B 33/061* (2013.01); *E21B 33/062* (2013.01); *E21B 33/063* (2013.01); *E21B 41/0007* (2013.01); *F16H 37/126* (2013.01); *F16K 3/0254* (2013.01); *F16K 31/046* (2013.01); *F16K 31/047* (2013.01); *F16K 31/048* (2013.01); *F16K 31/52* (2013.01); *F16K 31/53* (2013.01); *E21B 33/035* (2013.01); *E21B 33/064* (2013.01); *F16K 3/0218* (2013.01)

(58) Field of Classification Search
CPC .... F16K 3/0218; F16K 31/046; F16K 31/047; F16K 31/048; F16K 31/53; F16K 31/523; E21B 33/035; E21B 33/06; E21B 33/061; E21B 33/062; E21B 33/063; E21B 33/064; F16H 37/12–16
USPC ....... 251/1.3, 129.11, 129.12, 231, 248, 261, 251/279, 284–288
See application file for complete search history.

(56) References Cited

U.S. PATENT DOCUMENTS 2,502,573 A * 4/1950 Lee .......................... F16D 23/10
                                                        74/405
3,132,662 A * 5/1964 Allen .................... E21B 33/062
                                                     137/315.02
(Continued)

FOREIGN PATENT DOCUMENTS

DE   1475903 B1   6/1970
DE   23 39 310 A1   2/1975
(Continued)

OTHER PUBLICATIONS

Search Report, in connection to German Patent Application No. 19166314.5, dated Aug. 8, 2019.
(Continued)

*Primary Examiner* — Matthew W Jellett
(74) *Attorney, Agent, or Firm* — Meunier Carlin & Curfman LLC

(57) ABSTRACT

A subsea shutoff device, in particular for use in water depths of more than 30 m for operating a valve with a gate with a waterproof, oil filled housing, a crank mechanism arranged in the housing, and a rotary actuator, wherein the rotary actuator is adapted to operate a gate of a valve via the crank mechanism.

7 Claims, 2 Drawing Sheets

(51) Int. Cl.
  *E21B 41/00* (2006.01)
  *E21B 33/06* (2006.01)
  *F16K 31/04* (2006.01)
  *F16K 31/53* (2006.01)
  *F16H 37/12* (2006.01)
  *E21B 33/035* (2006.01)
  *E21B 33/064* (2006.01)

(56) References Cited

U.S. PATENT DOCUMENTS

| | | | |
|---|---|---|---|
| 3,143,894 A | | 8/1964 | Tennis |
| 3,269,694 A | * | 8/1966 | Hardison ............ F16K 3/0227 251/174 |
| 3,324,875 A | * | 6/1967 | Anderson ........... E21B 33/0375 137/236.1 |
| 4,296,910 A | | 10/1981 | Gratzmuller |
| 4,526,342 A | | 7/1985 | Wakefield |
| 5,636,652 A | * | 6/1997 | Toschi ...................... B66B 1/24 137/1 |
| 6,276,625 B1 | | 8/2001 | Chee et al. |
| 6,976,831 B2 | * | 12/2005 | Hunter ...................... F04B 9/02 417/486 |
| 7,097,148 B2 | * | 8/2006 | DeWall ................... F16K 31/53 251/129.12 |
| 7,231,934 B2 | | 6/2007 | Biester |
| 7,448,404 B2 | * | 11/2008 | Samuelsen ............. B65D 88/78 137/236.1 |
| 8,051,872 B2 | * | 11/2011 | Lenz ................... E21B 33/0355 137/81.2 |
| 8,327,875 B2 | * | 12/2012 | Grace ................... E21B 33/076 137/487.5 |
| 9,702,442 B2 | * | 7/2017 | Hobert ................ F16K 31/1225 |
| 9,714,722 B2 | * | 7/2017 | Hermann .......... F16K 31/52483 |
| 2008/0245432 A1 | | 10/2008 | Lenz |
| 2015/0184767 A1 | | 7/2015 | Oswald |
| 2015/0285036 A1 | * | 10/2015 | Theron ................... E21B 41/02 166/338 |

FOREIGN PATENT DOCUMENTS

| | | |
|---|---|---|
| DE | 28 36 381 A1 | 3/1979 |
| DE | 201 15 467 U1 | 3/2003 |
| DE | 102012017705 A1 | 3/2014 |
| GB | 709797 A | 6/1954 |
| WO | 2004003411 A1 | 1/2004 |

OTHER PUBLICATIONS

German Patent Application No. 10 2018 107 644.4, Search Report dated Mar. 1, 2019.

Office Action relating to European Application No. 19166314.5, dated Jul. 20, 2020. Machine Translation provided.

* cited by examiner

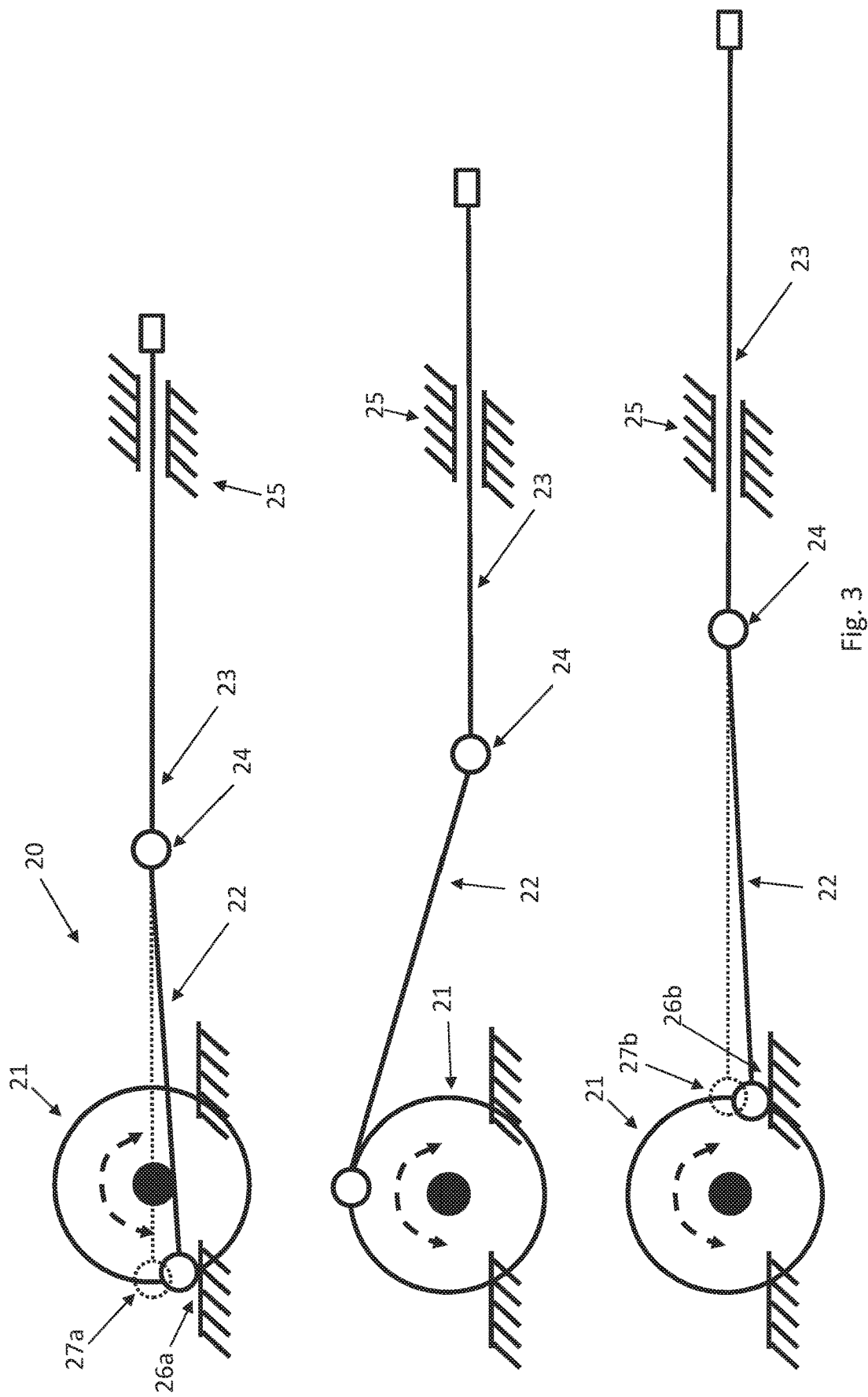

SUBSEA SHUT-OFF DEVICE

CROSS REFERENCE TO RELATED APPLICATION

This application claims priority to and benefit of German patent application DE 10 2018 107 644.4 filed Mar. 29, 2018, which is fully incorporated by reference and made a part hereto.

FIELD OF THE INVENTION

The invention relates to a Subsea shutoff device, in particular for blocking fluids in oil or gas extraction plants.

STATE OF THE ART

From the State of the Art, shutoff devices for an application in the Subsea area are known which use actuators for operating valves, for example.

From GB 2551094 A actuators with return springs are known. Here, the actuator operates a device in a first direction, and the return spring moves the actuator back into the original position in the opposite direction.

Subsea shutoff devices need to provide high requirements regarding safety and reliability, and at the same time have as little complexity as possible, and a low power consumption.

DISCLOSURE OF THE INVENTION

It is the objective of the invention to provide a Subsea shutoff device which is reliable, safe, robust or of simple design.

The objective is achieved by a Subsea shutoff device according to patent claim 1, use of a Subsea shutoff device and an oil or gas extraction plant with a Subsea shutoff device according to the independent patent claims.

A Subsea shutoff device with a waterproof, oil-filled housing, a crank mechanism arranged in the housing, and a rotary actuator is suggested, wherein the rotary actuator is adapted to operate a gate of a valve via the crank mechanism.

In the Subsea area it must be possible to reliably open and close fluid filled lines such as, for example, oil or gas delivery lines. Opening and closing function is provided by a valve which is, for example, operated by a mechanism and an actuator.

The Subsea shutoff device comprises a waterproof, oil filled housing, and is particularly configured for use in water depths of more than 30 meters (hereinafter: "m"). According to one aspect, the Subsea shutoff device can be configured for significantly greater depths and thus significantly higher pressures. For example, the shutoff device can be configured to withstand at least a depth pressure in 100 m water depth or even at least a depth pressure corresponding to 1000 m, at least a depth pressure corresponding to 3000 m or at least a depth pressure corresponding to 6000 m water depth. This is in particular possible due to the oil in the housing. By a slight deformation of the housing, the pressure of the virtually incompressible oil is increased. The counter pressure arising protects the housing against the high depth pressure.

A crank mechanism is arranged in the housing. The crank mechanism can operate the gate of a valve. The crank mechanism is protected by the housing. Advantageously, the crank mechanism can comprise a simple mechanical structure whereby it is reliable.

A rotary actuator can operate the gate of the valve via the crank mechanism. Here, the rotary actuator can be connected and/or operatively connected with the gate via the crank mechanism.

According to an aspect, the valve can be continuously actuated and operated via the gate between a first "open" condition and a second "closed" condition. Preferably, the valve is substantially operated in one of the conditions "open" and "closed", and not in an intermediate condition, as is explained below more in detail.

The crank mechanism can comprise a thrust crank mechanism with a crank, a thrust rod and a joint rod with a first and a second end wherein the first end of the joint rod is fixed on the crank, and the second end of the joint rod is connected with the thrust rod via a joint. The thrust rod is adapted to operate the gate of the valve. When turning the crank by the rotary actuator, the gate of the valve is operated. The crank mechanism can comprise further components, for example, further joints or arms. According to an aspect, the thrust rod can be directly connected with the joint rod via a joint or indirectly by further components of the crank mechanism.

According to a typical embodiment, the crank of the crank mechanism is adapted not to carry out a full rotation. The crank can comprise an end stop, in particular a first end stop and a second end stop whereby a rotational movement of the crank only between the first and the second end stop is possible. Thus, movement of the crank becomes predictable, and the condition, hence the position of the joint rod, defined.

Typically, defined positions of the gate can be allocated to the end stops. For example, the gate shuts off the valve, when the joint rod is at a first end stop, and the gate opens the valve, when the joint rod is at a second end stop. As already mentioned above, hence the valve in the "open" and "closed" condition has a defined and predictable position of the joint rod and/or a defined angle of rotation for the crank.

According to typical embodiments, the crank mechanism can comprise a first dead center and in particular also a second dead center. A dead center can in particular be defined as a rotational position of the crank, wherein the joint rod and the thrust rod are arranged in such a manner that a linear movement of the thrust rod from standstill is not transmitted on the crank. According to an aspect, in particular the force vector of the thrust rod is then perpendicular to the crank center. The joint between the joint rod and the thrust rod is then extended.

According to a typical embodiment, the crank mechanism has a first dead center and/or a second dead center, and the first end stop is close to the first dead center and/or the second end stop is close to the second dead center. Advantageously, by this simple mechanical arrangement one and/or two positions of the joint rod occur, in which no movement of the crank by a linear force on the thrust rod can be produced. For rotation of the crank, the rotary actuator is required. The dead centers in a crank mechanism with a circular crank and a joint rod are at 0° and 180° in typical embodiments.

The end stops can be arranged close to and in particular behind the dead centers. Close to the dead centers means, for example, at least 1°, at least 3° or at least 5°. Close to the dead centers typically means 40° max. or 30° max., in particular at most 20° away from the dead centers. The distances of the two end stops to the dead centers does not have to be identical.

According to a typical embodiment, the angle of rotation between the first end stop and the second end stop defines a maximum angle of rotation for the crank of more than 180°.

A force on the thrust rod in one of the end stops is thus blocked by the end stop or only a rotation up to the next dead center is possible. For a force transfer into the unblocked direction, rotation of the crank is necessary. Thus, the gate of the valve cannot open by itself on one of the end stops by a pressure on the valve.

The angle of rotation of the crank can be limited by the first and the second end stop. In particular, the angle of rotation for the crank can be limited to 240° max., in particular 220° max. The angular position of the crank can, for example, be fixed by the connection point with the joint rod.

The crank mechanism is operated by a rotary actuator. According to one embodiment, the rotary actuator can comprise an electric motor and a transmission, in particular a toothed gearing. The electric motor drives the transmission. The transmission can, for example, comprise a worm gear or a planetary gear which is operatively connected with the crank or an associated crank mechanism.

According to an embodiment, the electric motor and/or the transmission can be reversibly connected with the crank mechanism via a spur gear stage.

The electric motor, which typically comprises an electric motor casing, can be arranged in the oil filled housing. The transmission can also and independent of it be arranged in the oil filled housing. If the transmission is not arranged in the oil filled housing, the Subsea shutoff device can comprise a sealed interface between the crank mechanism in the housing and the transmission outside the housing.

In further typical embodiments, the electric motor and the transmission are likewise arranged in a separate housing, which is connected with the oil filled housing via a sealed interface.

In typical embodiments, the oil filled housing has a sealed interface with the valve. In particular, the thrust rod can operate the gate of the valve by the sealed interface or movement of the thrust rod can in any other way be transmitted to the gate of the valve by the sealed interface.

According to one embodiment, the thrust rod carries out a substantially linear movement, hence a movement with one degree of freedom. The direction of movement corresponds in particular to the same direction of movement of the gate for opening and closing of the valve. For this purpose, the crank mechanism can comprise a linear guiding for guiding the thrust rod restricting the thrust rod to a substantially one-dimensional movement.

The typical Subsea shutoff devices described herein can, for example, be used for controlling the flow of a fluid in a pipeline. In particular, the Subsea shutoff device can be used for controlling the flow of oil, gas or generally of a fluid in an oil or gas extraction plant in a water depth of at least 30 m. Devices in which embodiments of the invention can be used comprise: Subsea trees, Subsea processing, Subsea manifolds, Subsea pumping/compression, Subsea pipelines, Subsea High Integrity Pressure Protection Systems (HIPPS) and Subsea Blowout preventer (Bop).

Furthermore, an oil or gas extraction plant with one of the Subsea shutoff devices described above is suggested.

BRIEF DESCRIPTION OF DRAWINGS

Further advantages and features of preferred embodiments of the invention are explained below by means of the attached drawings. The drawings are not necessarily true to scale. Rather it is the functioning which shall be schematically shown. The figures show in:

FIG. 3 an embodiment of a crank mechanism and a motion sequence of the crank mechanism.

DESCRIPTION OF PREFERRED EMBODIMENTS

In the following typical embodiments are described by means of the figures, wherein the invention is not limited to the embodiments. Rather, the scope of the invention is determined by the patent claims.

Figure 1:
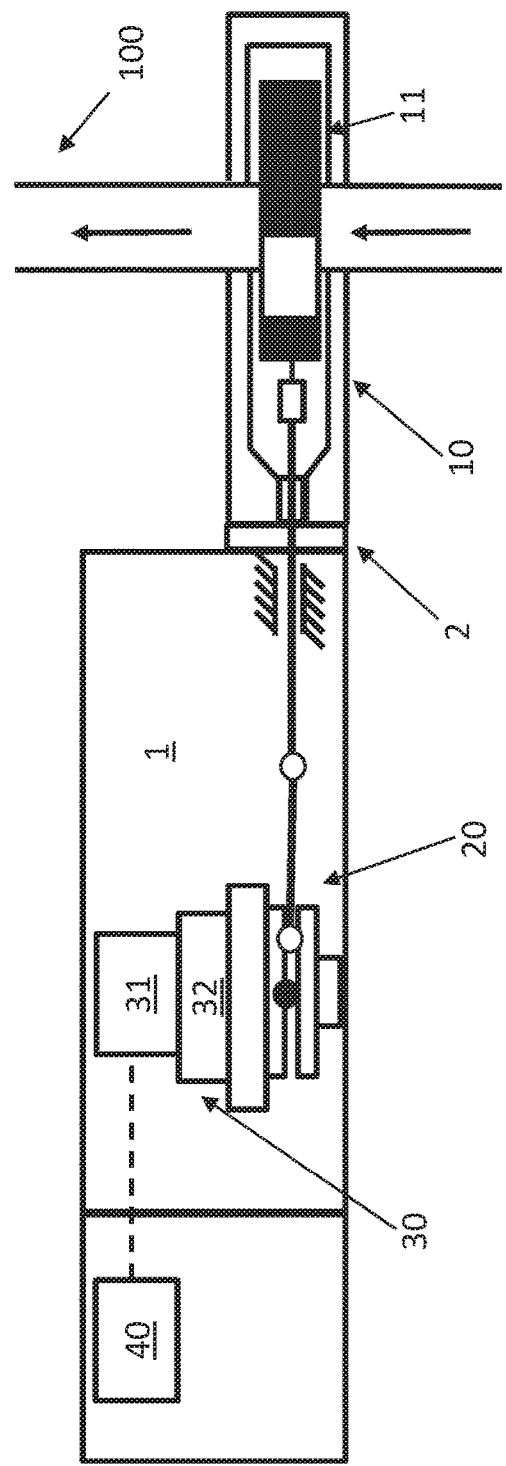
FIG. 1 a typical embodiment of the Subsea shutoff device.

In FIG. 1, a schematic view of a Subsea shutoff device in an oil or gas extraction plant 100 is shown. The Subsea shutoff device comprises a valve 10 with a gate 11 controlling the flow through the extraction plant 100. The gate 11 can be operated by a rotary actuator 30 via a crank mechanism 20. The crank mechanism 20 is arranged in a waterproof, oil filled housing 1.

In the embodiment of FIG. 1 the rotary actuator 30 comprises an electric motor 31 and a transmission 32 for operating the crank mechanism 20. The electric motor 31 can be controlled by the motor control 40, wherein the rotary actuator 30 sets into rotation a crank of the crank mechanism 20.

A typical embodiment of a crank mechanism is shown in detail in FIG. 3.

In the embodiment of FIG. 1, the electric motor 31 and the transmission 32 are likewise arranged in the oil filled housing 1. The housing 1 comprises a sealed interface 2 to the valve 10. The movement of the crank mechanism 20 is transmitted to the gate 11 of valve 10 by the sealed interface 2.

Figure 2:
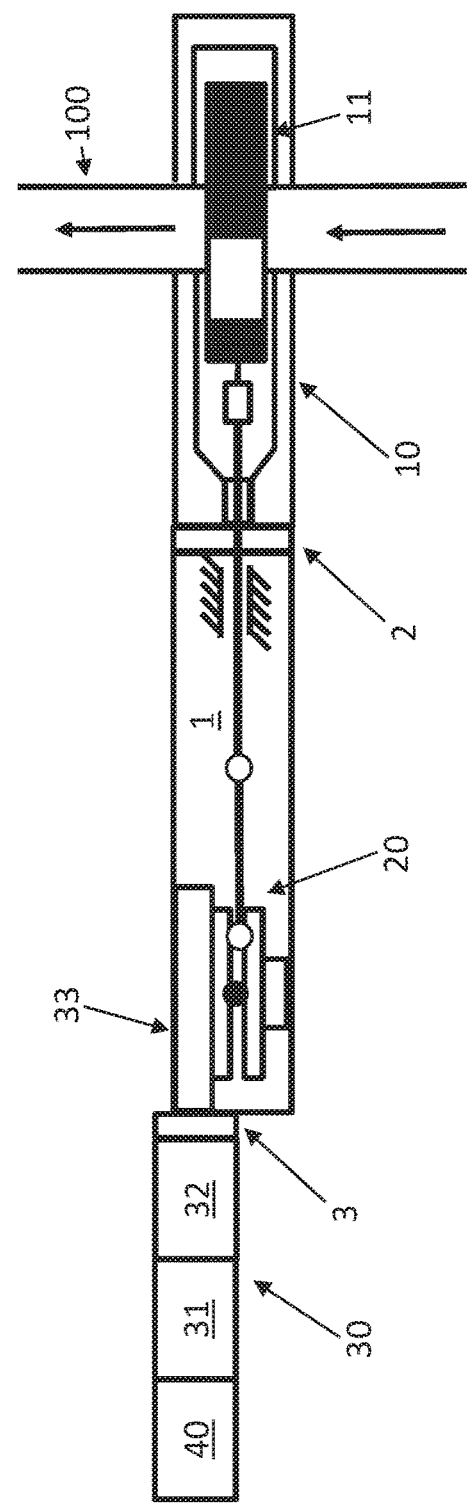
FIG. 2 another embodiment of the Subsea shutoff device.

FIG. 2 shows an alternative embodiment in which the electric motor 31 and the transmission 32 are arranged in a separate casing or in individual casings (not shown in FIG. 3) compared with housing 1, and are connected with housing 1 via a sealed interface 3. Thus, the rotary actuator 30 can be replaceable without it being necessary that the oil filled housing 1 is opened.

In the embodiment of FIG. 2, also an angular gear 33 is arranged in the housing 1 in order to rotate the rotation producible by the rotary actuator 30 by 90° in order to operate the crank mechanism.

In further embodiments, the crank mechanism is permanently connected with the valve. Possibly, such embodiments comprise a simpler structure, wherein, however, in embodiments with an interface between the crank mechanism and the valve a simpler exchange of the rotary actuator with crank mechanism is possible.

FIG. 3 shows more in detail an embodiment of a crank mechanism 20. The crank mechanism of FIG. 3 can, for example, be used in the embodiment of FIG. 1 or in the embodiment of FIG. 2.

The crank mechanism 20 comprises a thrust crank mechanism with a crank 21, a thrust rod 23 and a joint rod 22. The joint rod 22 comprises a first and a second end. The first end of the joint rod 22 is fastened in an articulated manner on the crank 21. The second end of the joint rod 22 is connected with the thrust rod 23 via a joint 24.

The thrust rod 23 is configured to operate a gate 11 of a valve 10 (not shown in FIG. 3). The joint rod 22 is pivotally connected with the crank 21. In other embodiments, the crank mechanism can also comprise more than two arms or more than two joints with corresponding support for the arms.

The crank mechanism 20 of the embodiment of FIG. 3 comprises a first end stop 26a and a second end stop 26b. A movement of the crank 21 of the crank mechanism is only possible between the two end stops 26a, 26b.

The upper representation of FIG. 3 shows the position of the crank 21 in the first end stop 26a; the lower representation shows the position of the crank 21 in the second end stop 26b. The representation in the center of FIG. 3 shows the movement of the crank 21 between the two end stops 26a, 26b.

A position of the shutoff valve, namely "open" or "closed", is allocated to each end stop 26a, 26b of the crank mechanism 20.

The extension of the joint 24 to 180° so that the joint rod 22 and the thrust rod 23 are located on a straight line with the pivot point of the crank 21 defines a dead center. The two dead centers 27a, 27b are shown in dotted lines. In the dead centers 27a, 27b, no torque can be transmitted from the output end of the joint rod 22 to the crank 21 so that forces, which act on the gate (not shown in FIG. 3), are entirely received by the pivot bearing of the crank.

The end stops 26a, 26b are located close to the dead centers 27a, 27b. Precisely, in the embodiment of FIG. 3, the end stops 26a and 26b are located by 20° each "behind" the dead centers 27a, 27b so that a total possible angle of rotation of the crank 21 of 180° plus 20° plus 20° corresponding to 220° in total, results.

The first end stop can be located at the position close to the thrust rod or at the remote position relative to the thrust rod. The second end stop each is located at the other position.

If the crank 21 at a position in one of the end stops 26a, 26b is loaded by a force from the gate (not shown in FIG. 3), no movement at all, if the force is pressing the crank 21 against the respective end stop 26a, 26b, or at most a movement up to the respective dead center 27a, 27b, is possible.

In embodiments, the end stops or the pivot bearing of the crank take up forces on the output side possibly occurring, and a reverse rotation and/or a movement from a position adopted on an end stop are made difficult or prevented. Thus, the positions of the gate can be safely controlled with a large tolerance. Moreover, the valve in both positions is secured without the use of energy. Pressure on the valve by a fluid in the extraction plant, for example, a pipeline, alone cannot operate the gate.

As shown in FIG. 3, the dead centers 27a, 27b of the typical embodiment shown in FIG. 3 are each on the opposite on the crank 21. Therefore, they are offset by an angle of rotation of 180°. The end stops 26a, 26b are positioned close to the dead centers 27a, 27b and behind the dead centers 27a, 27b. Thus, they define an angle of rotation of the crank 21 of more than 180°, in particular of more than 180° and less than 240°, in particular 220° max.

A dead center 27a, 27b is typically reached in the embodiment of FIG. 3, when the joint rod 22 and the thrust rod 23 are in one line on the crank 21. The joint rod 22 rotates on one end together with the crank 21, and on the other end is pivotally connected with the thrust rod 23.

Typically by a linear guiding, the thrust rod can only carry out a one-dimensional movement. In embodiments, the direction of movement can in particular correspond to the direction of movement of the gate.

The invention claimed is:

1. A subsea shutoff device, in particular for use in water depths of more than 30 m for operating a valve with a gate, said subsea shutoff device comprising:
    a housing, which is waterproof and oil filled;
    a crank mechanism arranged in the housing; and
    a rotary actuator,
wherein the rotary actuator is adapted to operate the gate of the valve via the crank mechanism,
wherein the crank mechanism comprises a thrust crank mechanism with a crank, a thrust rod and a joint rod with a first and a second end, wherein the first end of the joint rod is fixed on the crank, and the second end of the joint rod is connected with the thrust rod via a joint, and the thrust rod is adapted to operate the gate of the valve,
wherein the crank comprises a first end stop and a second end stop, and a rotational movement of the crank is only possible between the first and the second end stop,
wherein the first end stop and the second end stop define a maximum angle of rotation for the crank of more than 180°,
wherein the first end stop and the second end stop define a maximum angle of rotation for the crank, and the maximum angle of rotation is less than 240° max, and
wherein the rotary actuator comprises an electric motor and a transmission.

2. The subsea shutoff device according to claim 1, wherein the valve and the gate are connected with the rotary actuator with the thrust rod.

3. The subsea shutoff device according to claim 1, wherein the gate shuts off the valve when the joint rod is at the first end stop, and wherein the gate opens the valve when the joint rod is at the second end stop.

4. The subsea shutoff device according to claim 1, wherein the crank mechanism comprises a first dead center and/or a second dead center, and the first end stop is arranged close to the first dead center and/or the second end stop is arranged close to the second dead center.

5. The subsea shutoff device according to claim 1, wherein the crank mechanism comprises a linear guiding restricting the thrust rod to a substantially one-dimensional movement.

6. The subsea shutoff device according to claim 1, wherein the subsea device is configured to withstand at least a depth pressure in 1000 m water depth.

7. The subsea shutoff device according to claim 1, wherein the subsea shutoff device is used for controlling a fluid in an oil or gas extraction plant in a water depth of at least 30 m.

* * * * *